(12) United States Patent
Wilcher et al.

(10) Patent No.: US 7,510,650 B2
(45) Date of Patent: Mar. 31, 2009

(54) PERFORATED PLATE ELEMENT SCREEN WITH SEALED ELEMENT DESIGN

(75) Inventors: Stephen B. Wilcher, Harleysville, PA (US); Robert J. Slaby, Emmaus, PA (US); Nathan L. Panek, Springfield, PA (US)

(73) Assignee: WSG & Solutions, Inc., Montgomeryville, PA (US)

( * ) Notice: Subject to any disclaimer, the term of this patent is extended or adjusted under 35 U.S.C. 154(b) by 33 days.

(21) Appl. No.: 11/735,006

(22) Filed: Apr. 13, 2007

(65) Prior Publication Data

US 2007/0241039 A1    Oct. 18, 2007

Related U.S. Application Data

(60) Provisional application No. 60/744,796, filed on Apr. 13, 2006.

(51) Int. Cl.
*B01D 33/04*    (2006.01)
*E03F 5/14*    (2006.01)

(52) U.S. Cl. .................. 210/160; 210/232; 210/400

(58) Field of Classification Search ................. 210/155, 210/158, 160, 232, 328, 330, 400
See application file for complete search history.

(56) References Cited

U.S. PATENT DOCUMENTS

| | | | | |
|---|---|---|---|---|
| 1,190,921 A | * | 7/1916 | Leoni .......................... | 210/158 |
| 2,286,332 A | * | 6/1942 | Bleyer ......................... | 210/328 |
| 4,040,952 A | * | 8/1977 | Jopp ........................... | 210/400 |
| 4,221,390 A | * | 9/1980 | Bainbridge .................. | 210/400 |
| 4,360,426 A | * | 11/1982 | Wetzel ........................ | 210/160 |
| 5,326,460 A | * | 7/1994 | Cheesman et al. .......... | 210/160 |
| 5,415,766 A | * | 5/1995 | Quick et al. ................. | 210/160 |
| 5,501,793 A | * | 3/1996 | Cheesman et al. .......... | 210/160 |
| 6,267,880 B1 | * | 7/2001 | Jackson ....................... | 210/160 |
| 6,942,789 B2 | | 9/2005 | Wilcher et al. | |
| 2003/0080035 A1 | * | 5/2003 | Wilcher ....................... | 210/160 |
| 2005/0230294 A1 | * | 10/2005 | Seidl ........................... | 210/160 |

* cited by examiner

*Primary Examiner*—Christopher Upton
(74) *Attorney, Agent, or Firm*—Michael Best & Friedrich LLP

(57) ABSTRACT

A filtering device suitable for filtering a flow of fluid in a channel includes a plurality of filter elements coupled to one another to define a filter loop. The filter loop is configured to position a filter element in the channel to filter a portion of the flow of fluid. The filtering device also includes a plurality of resilient seal members. Each seal member is coupled to one of the plurality of filter elements such that the seal member is at least partially compressed by an adjacent filter element. At least one seal member inhibits the flow of fluid between the filter element to which the seal member is attached and the adjacent filter element.

39 Claims, 9 Drawing Sheets

PERFORATED PLATE ELEMENT SCREEN WITH SEALED ELEMENT DESIGN

RELATED APPLICATION DATA

This application claims benefit under 35 U.S.C. Section 119(e) of U.S. Provisional Application No. 60/744,796, filed Apr. 13, 2006, which is fully incorporated herein by reference.

BACKGROUND

The present invention relates to a perforated screen filtering device. In particular, the invention relates to a sealing system for a perforated screen filtering device suitable for use in filtering a flow of fluid in a channel.

The process of cleaning or treating a fluid, such as water, often includes many stages of filtering. For example, waste water enters a treatment facility and passes through several different treatment stages before being discharged. Often, one of the first treatment stages is a course filter that removes large unwanted particles or components. For example, waste water often includes bags, cups, sticks, etc. that are easily filtered out before treatment of the water begins.

Often, a perforated plate filtering device is employed to remove these large particles from the flow of water. The device includes a plurality of perforated elements that allow for the passage of water but inhibit the passage of large unwanted particles. However, the large perforated elements are easily clogged and must be cleaned periodically. Additionally, leakage around the perforated elements reduces the effectiveness of the filter device. Sealed elements are employed to reduce this leakage. However, seals can wear quickly and require additional maintenance, which often requires the draining of fluid from the channel, thereby reducing the operating time of the filter device.

SUMMARY

In one construction, the invention provides a filtering device suitable for filtering a flow of fluid in a channel. The filtering device includes a plurality of filter elements coupled to one another to define a filter loop. The filter loop is configured to position a filter element in the channel to filter a portion of the flow of fluid. The filtering device also includes a plurality of resilient seal members. Each seal member is coupled to one of the plurality of filter elements such that the seal member is at least partially compressed by an adjacent filter element. At least one seal member inhibits the flow of fluid between the filter element to which the seal member is attached and the adjacent filter element.

In another construction, the invention provides a filtering device suitable for filtering a flow of fluid in a channel. The filtering device includes a plurality of filter elements coupled to one another to define a filter loop. Each filter element includes a first end and a second end. The filter loop is configured to position a filter element in the channel to filter a portion of the flow of fluid. The filter element includes a first end and a second end. A side frame is at least partially disposed within the channel and is configured to support the filter element adjacent the first end and adjacent the second end. An internal frame support is disposed between the first end and the second end and spaced a non-zero distance from the filter element. The non-zero distance is selected such that the internal frame support contacts the filter element to inhibit deflection of the filter element beyond a predetermined deflection.

In yet another construction, the invention provides a filtering device suitable for filtering a flow of fluid in a channel. The flow of fluid defines an upstream side, a downstream side, and a flow direction. The channel defines a channel floor and an operating floor. The filtering device includes a plurality of filter elements coupled to one another to define a filter loop. The filter loop is configured to position a filter element in the channel to filter a portion of the flow of fluid. A side frame is disposed at least partially within the channel and configured to support the plurality of filter elements for movement. A connector is accessible from the upstream side to connect one of the plurality of filter elements to the side frame. The connector is configured to be removed to allow removal of the filter element in a direction substantially parallel to the flow direction.

In another construction, the invention provides a filtering device suitable for filtering a flow of fluid in a channel. The filtering device includes a plurality of filter elements coupled to one another to define a filter loop. The filter loop is configured to position a filter element in the channel to filter a portion of the flow of fluid. A first seal member is disposed substantially within the channel and movable in a direction substantially perpendicular to the flow of fluid to contact a first side of the filter element in the channel. A second seal member is disposed substantially within the channel and is movable in a direction substantially perpendicular to the flow of fluid to contact a second side of the filter element in the channel. A third seal member is disposed substantially within the channel and is configured to contact the channel and the first side of the filter element in the channel. A fourth seal member is disposed substantially within the channel and is configured to contact the channel and the second side of the filter element in the channel. The first seal member, the second seal member, the third seal member, and the fourth seal member cooperate to inhibit flow between the channel and the filter element in the channel.

In yet another construction, the invention provides a filtering device suitable for filtering a flow of fluid in a channel. The filtering device includes a plurality of filter elements coupled to one another to define a filter loop. The filter loop is configured to position a filter element in the channel to filter a portion of the flow of fluid. Each filter element includes a perforated plate positioned such that the plate extends in a lengthwise direction that is substantially normal to the flow of fluid. The perforated plate includes a first end, a second end, and a plurality of apertures. Each filter element also includes a first seal plate and a second seal plate. The first end is embedded within the first seal plate and the second end is embedded within the second seal plate. The first end and the first seal plate cooperating to define a first seal.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
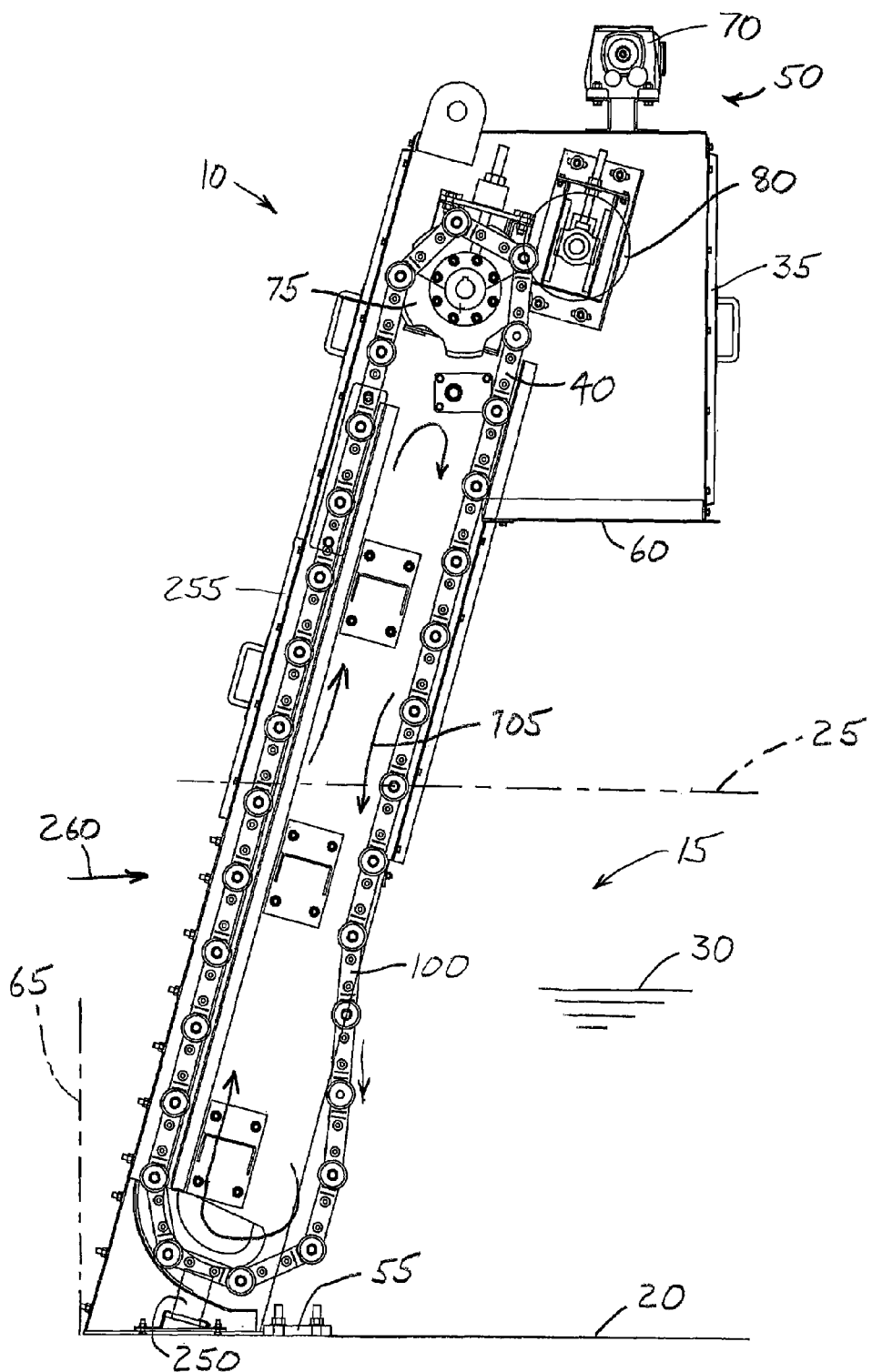
FIG. 1 is a side view of a filtering device embodying the invention.

FIG. 1 illustrates a filtering device 10 embodying the invention and suitable for use in filtering particles larger than the perforated element openings and debris from a flow of fluid, such as water. The filtering device 10 is positioned within a channel 15 or trough such that a portion of the filtering device 10 is submerged in the flow. Generally, the channel 15 defines a channel floor 20 and an operating floor 25, with a fluid level 30 being maintained between these two floors 20, 25. Thus, only a portion of the filtering device 10 disposed within the channel 15 is submerged. The remainder of the filtering device 10 is above the fluid level 30 with a significant portion of the filtering device 10 being disposed above the operating floor 25. The fluid flows through the submerged portion of the filtering device 10 to filter the fluid.

The filtering device 10 includes a side frame 35, a drive chain 40, a plurality of perforated elements 45, and a drive member 50. The side frame 35 provides structural support for the remaining components. In one construction, welded beam elements (e.g., angle, channel, box, tube, etc.) are employed to form the side frame 35 with other constructions employing other arrangements. The side frame 35 includes a lower attachment portion 55 that facilitates the attachment of the side frame 35 to the channel floor 20. Upper support points 60 are also provided to couple the side frame 35 to the operating floor 25. In the illustrated construction, the side frame 35 is arranged to support the perforated elements 45 at an angle of about 15 degrees with respect to a vertical axis 65. In other constructions, the side frame 35 is arranged to support the perforated elements 45 at other angles, such as but not limited to 5 degrees, 30 degrees, and 45 degrees from the vertical axis 65.

In the illustrated construction, the drive member 50 includes an electric motor 70 and a driving shaft supported by the side frame 35. The main drive shaft sprockets 75 are connected via a belt or chain to the motor 70 and in turn provide driving movement of the element loop. In addition, some constructions include a rotating brush 80 driven by the motor 70 and positioned to clean the perforated elements 45 as they pass. Other constructions may employ other drive arrangements such as hydraulically driven systems or direct shaft mounted drive systems if desired.

Figure 2:
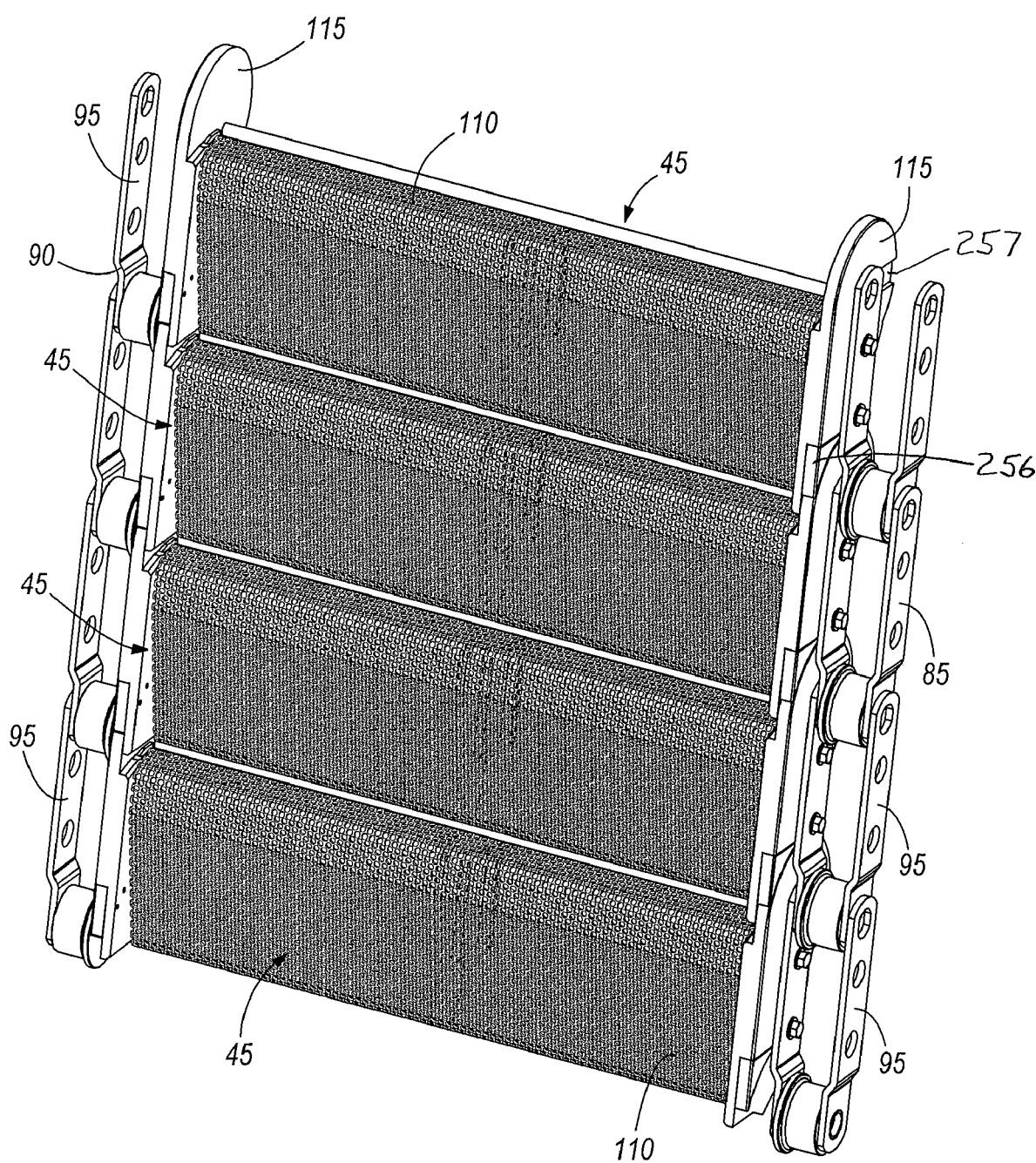
FIG. 2 is a perspective view of a plurality perforated elements coupled to a drive chain.

As shown in FIG. 2, the drive chain 40 includes a first side chain 85 and a second side chain 90, with each side chain 85, 90 disposed on opposite sides of the side frame 35. In the illustrated construction, each side chain 85, 90 is coupled to the drive member 50 such that rotation of the drive member 50 produces a corresponding movement of the side chains 85, 90. The main drive shaft sprocket 75 is arranged to assure that the movement of the drive chain 40 is slower than the rotation of the drive member 50. In other constructions, one of the side chains 85, 90 is driven by the drive member 50, while the second side chain 85, 90 simply follows the first.

With reference to FIGS. 1 and 2, each side chain 85, 90 includes a plurality of links 95 arranged such that each link 95 engages two adjacent links 95 and supports one of the perforated elements 45 to define a filter loop 100. The links 95 connect to one another such that they are movable with respect to one another. Thus, during operation, the filter loop 100 moves along a filter path 105 in response to motor operation. During this motion, each of the perforated elements 45 moves past the rotating brush 80 and is cleaned.

Figure 3:
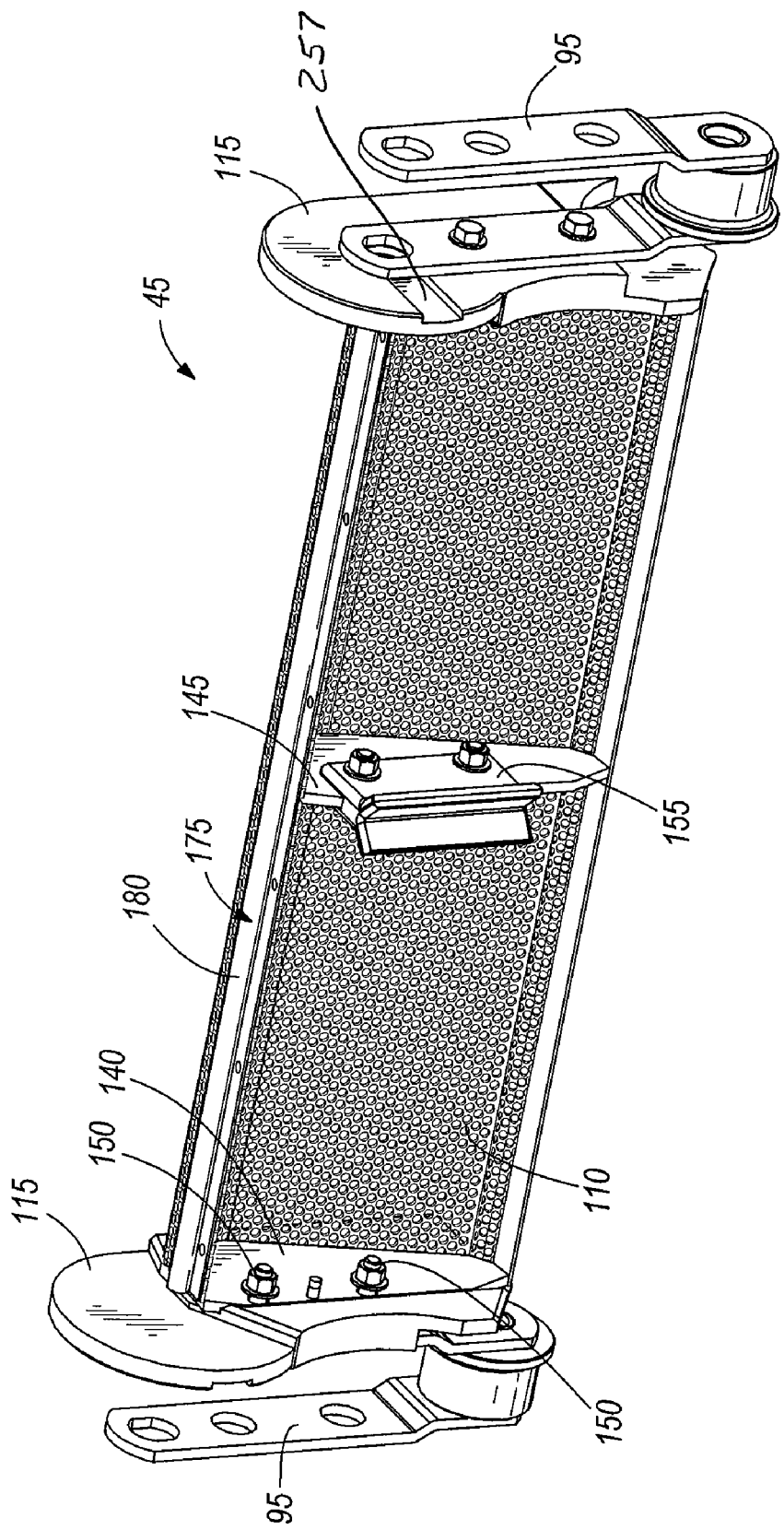
FIG. 3 is a perspective view of the back side of one of the perforated elements of FIG. 2.
Figure 5:
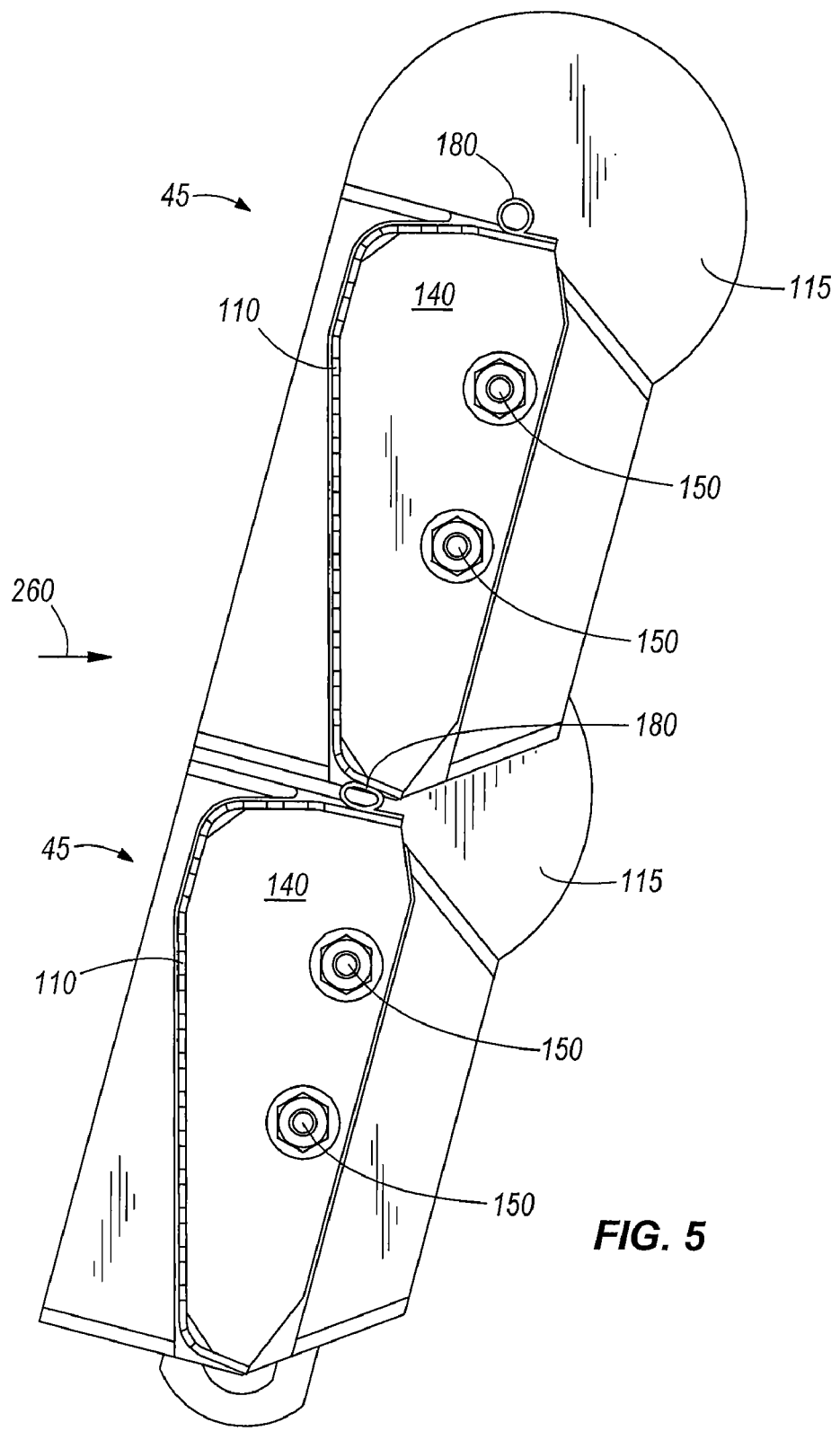
FIG. 5 is a side one of the perforated elements of FIG. 2 including a P-seal.

As shown in FIG. 3, each perforated element 45 includes a perforated plate 110, a first seal plate 115, and a second seal plate 115. The perforated plate 110 is preferably formed from a metal. However, other materials could be employed if desired. A plurality of apertures 125 are formed in the plate 110 with each aperture 125 sized to stop the unwanted particles or debris. In one construction, the apertures 125 are between 1 mm and 2 mm in diameter with smaller or larger apertures 125 also being suitable for use. In the illustrated construction, the apertures 125 are circular with other shapes also being possible. As is best illustrated in FIG. 5, the perforated plate 110 is not planar but rather is substantially C-shaped.

Figure 4:
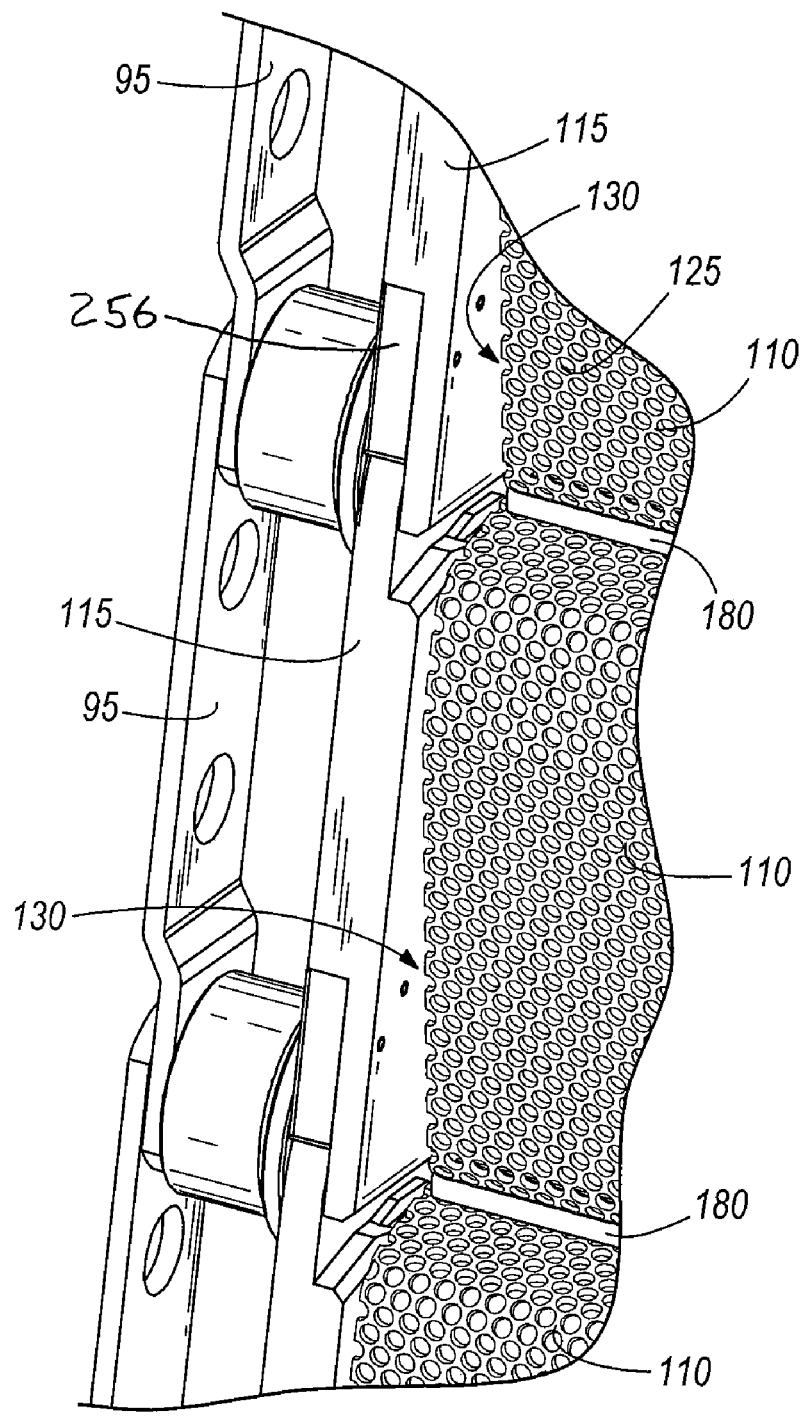
FIG. 4 is an enlarged perspective view of a portion of the perforated elements of FIG. 2.
Figure 9:
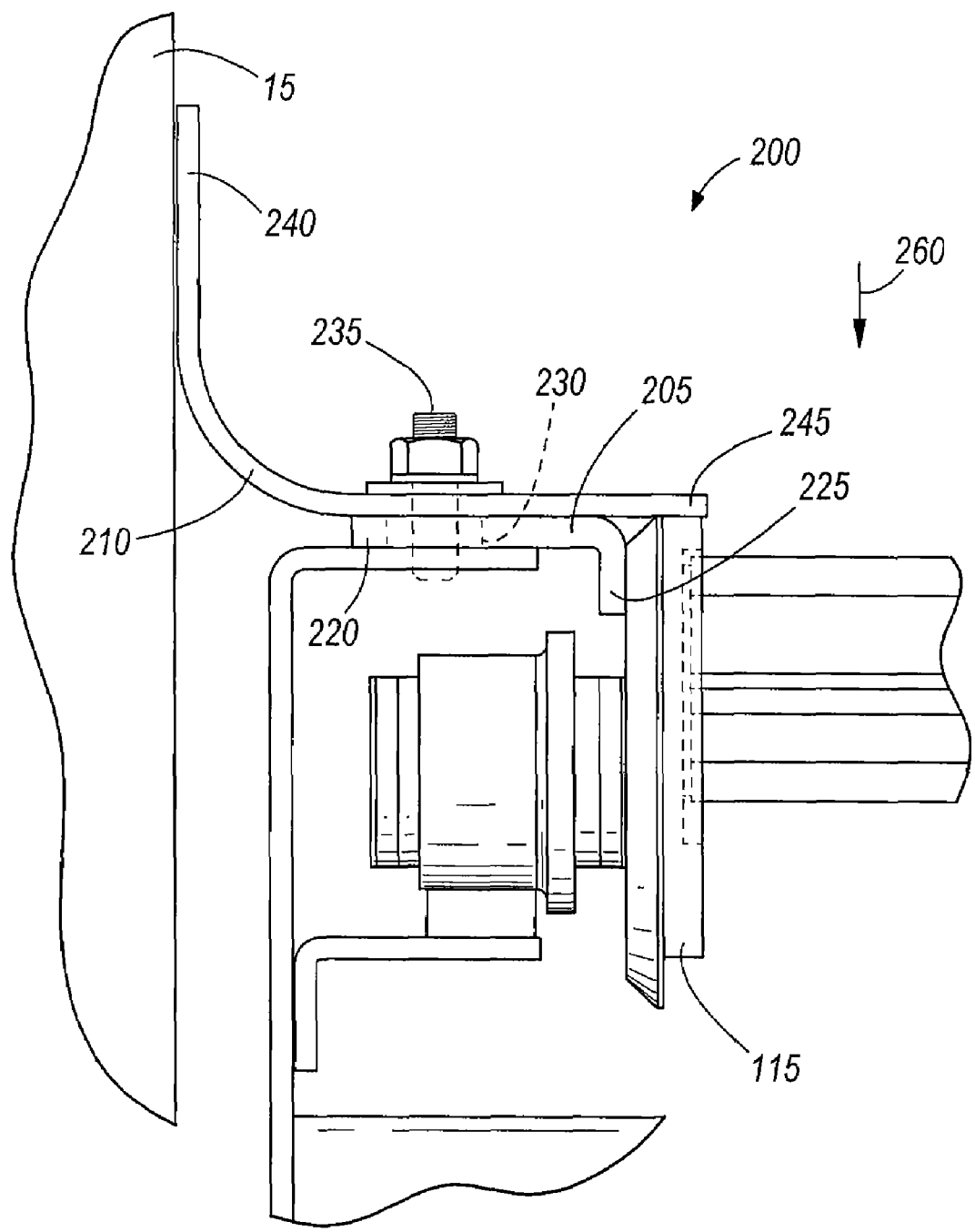
FIG. 9 is an enlarged top view of a first end of one of the perforated elements of FIG. 2.

As is illustrated in FIG. 4, the first and second seal plates 115 are preferably formed from a non-metallic material (e.g., plastic) and include a groove or recess 130 that receives one end of the perforated plate 110. Thus, the end of the perforated plate 110 is embedded within the seal plate 115. As illustrated in FIG. 9, the end of the perforated plate 110 is imbedded a depth 135 into the seal plate 115. In the illustrated construction, the depth 135 is about 6 mm with larger or smaller depths 135 being possible. In one construction, the seal plates 115 are molded directly to the perforated plates 110 to assure a tight fit between the perforated plate 110 and the seal plate 115.

Turning to FIG. 3, each perforated element 45 includes two end reinforcing plates 140 and an internal gusset plate 145. Each reinforcing plate 140 attaches to the perforated plate 110 and to one of the seal plates 115 to provide additional stiffness and rigidity. In a preferred arrangement, the reinforcing plates 140 are welded to the perforated plate 110 and bolted to the seal plate 115 using a pair of chain bolts 150 or studs. The chain bolts 150 pass through the seal plates 115 and attach to one of the links 95 of the drive chain 40 to attach the perforated element 45 to the drive chain 40.

The gusset plate 145 is positioned between the seal plates 115 and attached to the perforated plate 110. In the illustrated construction, the gusset plate 145 is centered between the seal plates 115. However, this position could vary if desired. The gusset plate 145 is preferably welded to the perforated plate 110 and provides additional strength and support for the perforated plate 110. In addition, the gusset plate 145 supports a wear shoe 155.

Figure 7:
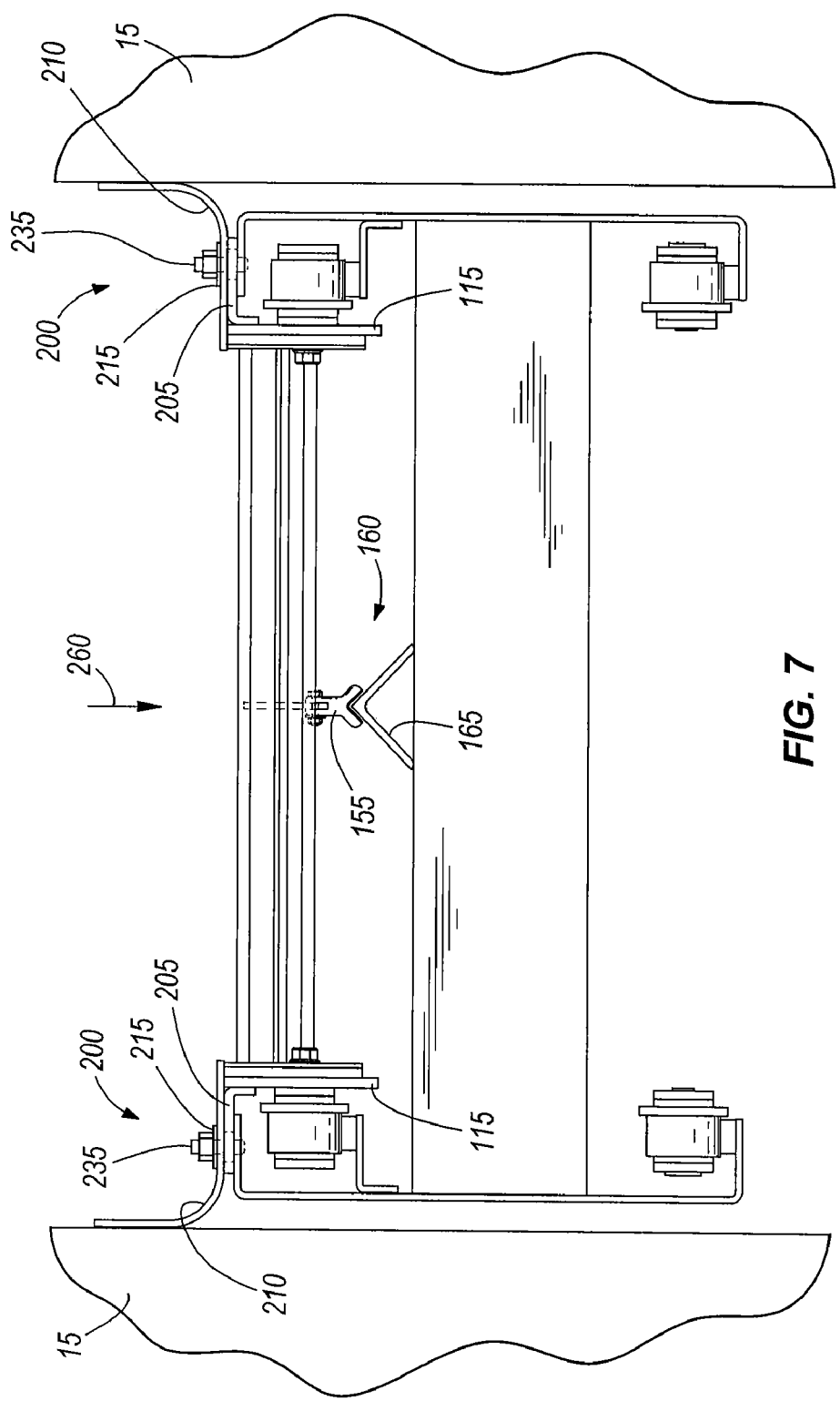
FIG. 7 is a top view of a perforated element including an internal support member.
Figure 8:
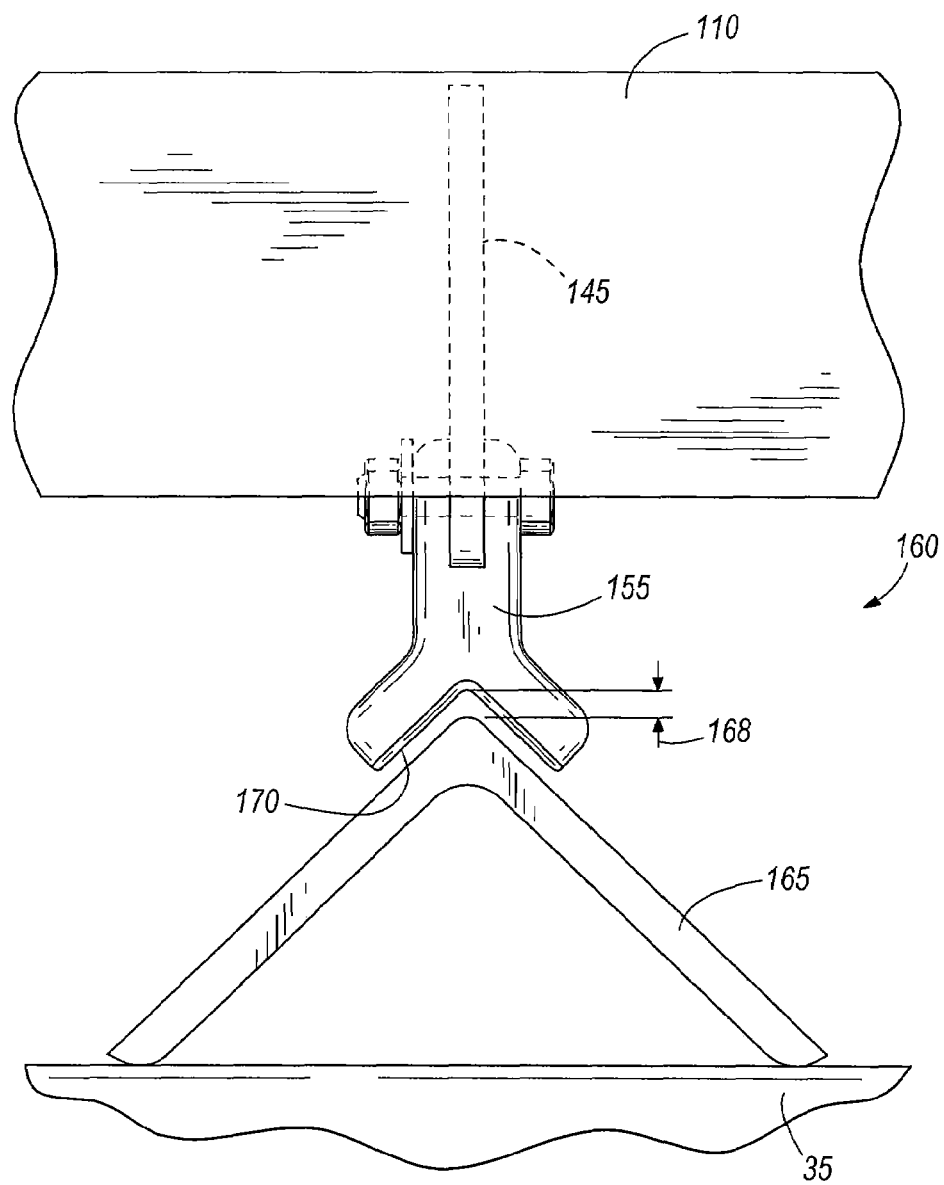
FIG. 8 is an enlarged top view of the internal support member of FIG. 7.

The wear shoe 155, illustrated in FIGS. 3, 7, and 8 partially defines an internal support 160 which also includes a frame element support 165 or internal support member. The frame element support 165, illustrated in FIGS. 7 and 8 is a substantially V-shaped component positioned to engage the wear shoe 155. In one construction, angle iron is fixedly attached to the side frame 35 to act as the frame element support 165. In other constructions, other components and shapes are used to form the frame element support 165. Many different shapes are possible so long as the frame element support shape substantially matches the wear shoe shape to assure proper engagement.

The wear shoe 155 is also substantially V-shaped and is positioned a predetermined non-zero distance 168 from the frame element support 165. The wear shoe 155 includes a non-metallic element 170 positioned adjacent the frame element support 165 such that when the wear shoe 155 contacts the frame element support 165, the non-metallic element 170 makes contact. In some constructions a metallic wear shoe 155 is employed. However, the non-metallic material is preferred for the lower friction and lower wear rate it provides.

In the illustrated construction, the wear shoe 155 is bolted to the gusset plate 145. Of course, other constructions include a wear shoe 155 that is welded to the gusset plate 145 or that is formed as part of the gusset plate 145.

Each perforated element 45 includes an interstitial seal 175 disposed between adjacent perforated plates 110. As illustrated in FIGS. 3 and 5, the interstitial seal 175 extends along a surface of the perforated plate 110 and into the seal plates 115 on either end. As with the perforated plate 110, preferred constructions embed a portion of the interstitial seal 175 into the seal plates 115 to inhibit leakage between the interstitial seal 175 and the seal plates 115. Thus, the interstitial seals 175 inhibit the unwanted passage of fluid between adjacent perforated elements 45.

Figure 6:
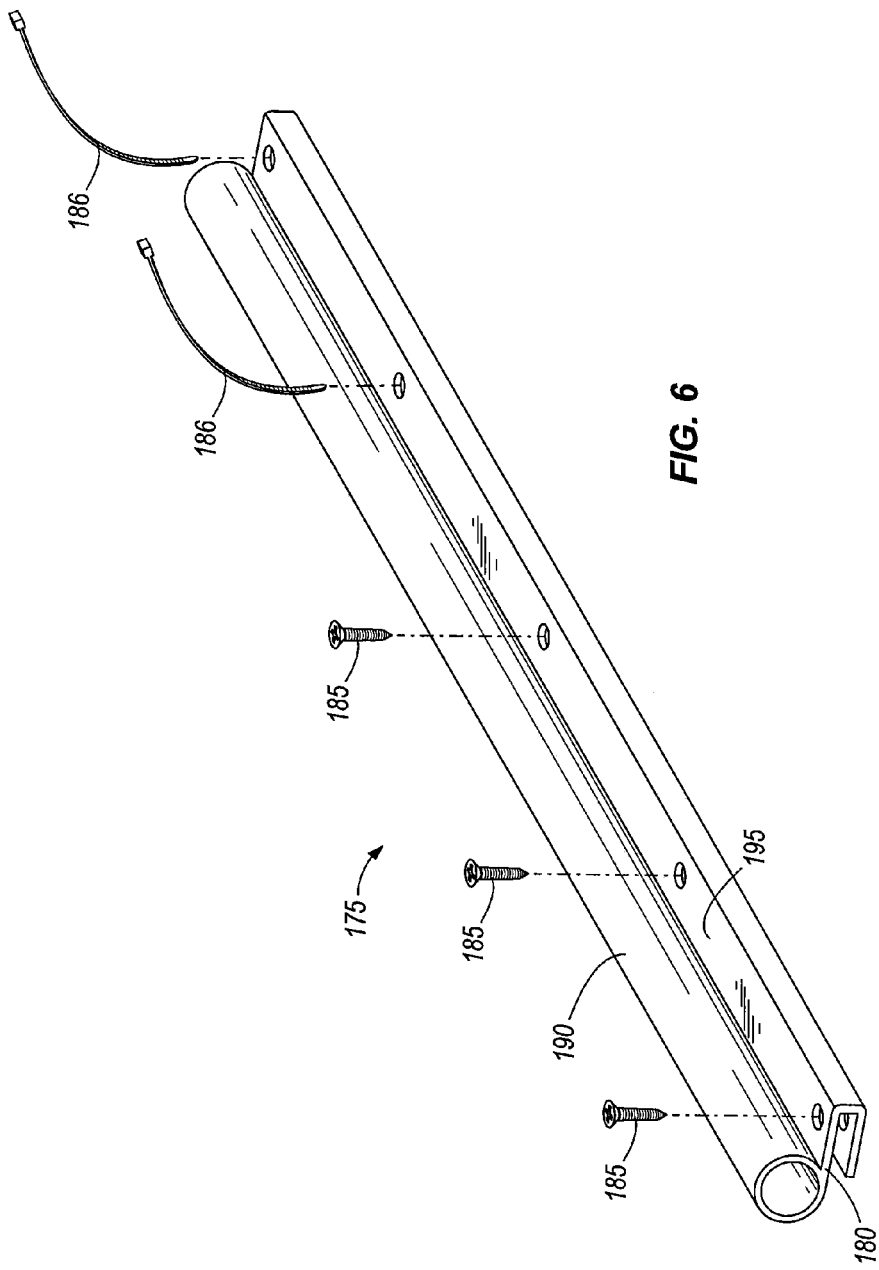
FIG. 6 is a perspective view of a P-seal.

In the illustrated construction, the interstitial seals 175 include a P-seal member 180 and several bolts 185, illustrated in FIG. 6. The P-seal member 180 is an elongated resilient member that is substantially P-shaped when viewed in a section parallel to the seal plates 115. Thus, the P-seal member 180 includes a substantially circular portion 190 and a tail portion 195 extending from the circular portion 190. In a preferred arrangement illustrated in FIG. 6, the tail portion 195 is substantially U-shaped to provide a surface suitable for use in attaching the P-seal member 180 to the perforated plate 110 using the bolts 185 or other attachment means (e.g., zip ties 186). The U-shaped portion includes two rows of apertures and is sized to wrap around an edge of the perforated plate 45 such that the apertures align. Bolts 185, zip-ties 186, and/or other attachment means pass through the apertures and the perforated plate to attach the P-seal member 180 to the perforated plate 45.

The circular portion 190 is sized to be larger than the anticipated space between adjacent perforated elements 45 such that it is compressed slightly (shown in FIG. 5) when the perforated elements 45 are in their operating position. Generally, a resilient material, such as rubber, is used to form the P-seal member 180. However, other materials may be used if desired.

FIG. 7 illustrates a side seal 200 employed on each side of the side frame 35 to inhibit flow between the channel 15 and the filtering device 10. Specifically, the side seals 200 provide for a seal on either side of the side frame 35 to inhibit the unwanted passage of fluid around the sides of the perforated elements 45. In preferred constructions, both side seals 200 are similar. However, slight variations could be employed in the two side seals 200 if desired.

FIG. 9 illustrates one of the side seals 200 as including an adjustable side seal 205, a channel wall seal 210, and a reinforcing bar 215. The adjustable side seal 205 includes an engagement leg 220 and a seal leg 225. The engagement leg 220 engages the side frame 35 and is movable in a direction substantially normal to the seal plates 115. In one construction, one or more slots 230 are formed in the engagement leg 220 and one or more bolts 235 pass through the slots 230 to attach the adjustable side seal 205 to the side frame 35. The slots 230 allow for movement of the adjustable side seal 205 toward or away from the seal plate 115.

The seal leg 225 engages the adjacent seal plate 115 of the perforated element 45 or elements that are below the fluid level 30 to provide a first seal. The movement of the adjustable side seal 205 allows for adjustment of the seal position to improve the seal. In preferred constructions, the adjustable side seal 205 is formed from a metal. However, other materials may be employed if desired.

It should be noted that a single adjustable side seal 205 could be employed on each side of the perforated element 45. In this arrangement, the single adjustable side seal 205 contacts and seals multiple perforated elements 45. In other constructions, multiple adjustable side seals 205 are employed with each one contacting as few as one perforated element 45 to establish the first seal.

The channel wall seal 210 includes a channel leg 240 and a seal leg 245 and attaches to the side frame 35 adjacent the adjustable side seal 205. The channel leg 240 contacts the channel 15 and the seal leg 245 contacts the adjustable side seal 205 and the adjacent seal plate 115 such that during operation, the pressure created by the flow of fluid pushes the channel leg 240 against the channel 15 and the seal leg 245 against the adjustable side seal 205 and the adjacent seal plate 115, thereby providing a second seal. In preferred constructions, a resilient material, such as rubber or neoprene, is employed as the channel wall seal 210. However, other materials may be used if desired.

The reinforcing bar 215 is positioned such that the channel wall seal 210 is sandwiched between the reinforcing bar 215 and the adjustable side seal 205. The reinforcing bar 215 thus provides additional stiffness and improves the attachment of the channel wall seal 210 to the adjustable side seal 205.

To complete the seal system, a bottom seal 250, such as a brush seal shown in FIG. 1 is employed to seal the bottom of the filtering device 10 and inhibit the unwanted passage of fluid below the perforated elements 45.

The arrangement of the perforated elements 45 also provides for their easy removal for maintenance or replacement. With reference to FIG. 1, the portion of the filtering device 10 above the operating floor 25 is easily accessible. To remove one of the perforated elements 45, a user simply removes a pair of guards 255 that cover the side chains 85, 90 to gain access to the chain bolts 150. In addition, the user removes a seal plate cover 256 (shown in FIGS. 2 and 4) on each side of the perforated elements 45 adjacent to the perforated element 45 being removed. In one construction, the seal plates include apertures that provide access to the seal plate covers 256 or to pins holding the seal plate covers 256 in place to allow for the removal of the seal plate covers 256. The perforated element 45 can then be pulled out along the paths defined by the slots 257. It should be noted that the seal plate covers 256 also provide some sealing function and reduce the available space for leakage around the perforated elements 45.

Thus, removal of the chain bolts 150 and the seal plate covers 256 allows for the removal of the perforated element 45 without removing the chain link 95 or otherwise impeding the operation of the filtering device 10. A new perforated element 45 can than be installed in place of the old perforated element 45 to allow the filtering device 10 to continue operation. Thus, there is no need to drain the fluid from the channel 15 or otherwise suspend the filtering operation to make a repair to a perforated element 45.

Additionally, the perforated elements 45 can be removed and installed in a direction parallel to a flow direction 260. Thus, multiple filtering devices 10 can be positioned adjacent one another without inhibiting maintenance. Prior art filtering devices required removal of perforated elements in a direction perpendicular to the flow 260, thereby requiring additional space between adjacent filtering devices. Thus, the invention allows a smaller structure and lower capital cost to the plant owner.

In operation, a fluid to be filtered (e.g., water) flows along the channel 15. The fluid encounters the filtering device 10 disposed in the flow such that the fluid must pass through the perforated elements 45 before continuing to flow down the channel 15. As the fluid passes through the perforated elements 45, debris and other filtered items collect in front of the perforated elements 45. As the debris collects, the pressure differential across the perforated elements 45 increases and the flow through the perforated elements 45 decreases. During some operating conditions, the flow may cause one or more of the perforated elements 45 to deflect. If the deflection is in excess of the predetermined distance 168 between the wear shoe 155 and the frame element support 165, the wear shoe 155 will engage the frame element support 165 and inhibit excessive and potentially damaging deflection of the perforated element 45.

Operation of the motor 70 produces rotation of the drive chain 40 which rotates the clogged perforated elements 45 upward and out of the flow stream, whereby the debris can be collected and removed from the channel 15. The movement of the drive chain 40 also places new perforated elements 45 in the flow stream to begin the cycle. During movement of the drive chain 40, wear shoes 155 in contact with the frame element support 165 will slide until the perforated element 45 is removed from the flow.

The fluid pressure on the upstream side of the filtering device 10 assures that the side seals 200 inhibit unwanted flow, while the compression of the P-seal 180 inhibits unwanted flow between the perforated elements 45. As such, the present invention provides an improved seal system for a channel filtering device 10. In addition, the arrangement of the perforated elements 45 improves the seal between perforated elements 45, while reducing the manufacturing tolerances. The reduced tolerances reduce the cost of the components, while the improved maintainability of the arrangement reduces down time required for maintenance.

As discussed above, should one of the perforated elements 45 become damaged during operation, the perforated element 45 can be easily removed and replaced without having to drain the channel 15 or otherwise suspend filtering operations.

Various features and advantages of the invention are set forth in the following claims.

What is claimed is:

1. A filtering device suitable for filtering a flow of fluid in a channel, the filtering device comprising:
    a plurality of filter elements coupled to one another to define a filter loop, the filter loop configured to position a filter element in the channel to filter a portion of the flow of fluid; and
    a plurality of resilient seal members, each seal member coupled to one of the plurality of filter elements such that the seal member is at least partially compressed by an adjacent filter element, at least one seal member inhibiting the flow of fluid between the filter element to which the seal member is attached and the adjacent filter element, wherein at least one of the filter elements includes a perforated plate, a first seal plate, and a second seal plate, and wherein a first end of the perforated plate is embedded in the first seal plate, and a second end of the perforated plate is embedded in the second seal plate.

2. The filtering device of claim 1, wherein the first seal plate and the second seal plate are molded using a plastic material and the perforated plate is formed from a metal.

3. The filtering device of claim 1, wherein one of the resilient seal members includes a first end embedded in the first seal plate and a second end embedded in the second seal plate.

4. The filtering device of claim 1, wherein each of the plurality of resilient seal members defines a long axis, and wherein each of the plurality of resilient seal members is substantially P-shaped when viewed in a section defined by a plane normal to the long axis.

5. The filtering device of claim 1, wherein each of the plurality of resilient seal members is formed from a rubber material.

6. The filtering device of claim 1, further comprising a first side seal assembly disposed between the channel and the filter element, and a second side seal assembly disposed between the channel and the filter element, the first side seal assembly and the second side seal assembly cooperating to inhibit the flow of fluid between the channel and the filter element.

7. The filtering device of claim 6, wherein a portion of the first side seal assembly and a portion of the second side seal assembly are movable in a direction substantially normal to the flow of fluid.

8. The filtering device of claim 1, further comprising an internal support member disposed between a first end of the seal element and a second end of the seal element and spaced a non-zero distance from the filter element, the non-zero distance selected such that the filter element contacts the internal support member to inhibit deflection of the filter element beyond a predetermined deflection.

9. A filtering device suitable for filtering a flow of fluid in a channel, the filtering device comprising:
    a plurality of filter elements coupled to one another to define a filter loop, the filter loop configured to position a filter element in the channel to filter a portion of the flow of fluid, the filter element including a first end and a second end;
    a side frame at least partially disposed within the channel and configured to support the filter element adjacent the first end and adjacent the second end;
    an internal frame support disposed between the first end and the second end and spaced a non-zero distance from the filter element, the non-zero distance selected such that the internal frame support contacts the filter element to inhibit deflection of the filter element beyond a predetermined deflection, such that the side frame and the internal frame support the filter element under some operating conditions and the side frame alone supports the filter element during the remaining operating conditions.

10. The filtering device of claim 9, wherein each of the filter elements includes a perforated plate, a first seal plate, and a second seal plate, and wherein a first end of the perforated plate is embedded in the first seal plate, and a second end of the perforated plate is embedded in the second seal plate.

11. The filtering device of claim 10, wherein the first seal plate and the second seal plate are molded using a plastic material and the perforated plate is formed from a metal.

12. The filtering device of claim 10, further comprising a plurality of resilient seal members, each seal member coupled to one of the plurality of filter elements such that the seal member is at least partially compressed by an adjacent filter element.

13. The filtering device of claim 12, wherein one of the resilient seal members includes a first end embedded in the first seal plate and a second end embedded in the second seal plate.

14. The filtering device of claim 12, wherein each of the plurality of resilient seal members defines a long axis, and wherein each of the plurality of resilient seal members is substantially P-shaped when viewed in a section defined by a plane normal to the long axis.

15. The filtering device of claim 9, further comprising a first side seal assembly disposed between the channel and the filter element, and a second side seal assembly disposed between the channel and the filter element, the first side seal assembly and the second side seal assembly cooperating to inhibit the flow of fluid between the channel and the filter element.

16. The filtering device of claim 15, wherein a portion of the first side seal assembly and a portion of the second side seal assembly are movable in a direction substantially normal to the flow of fluid.

17. The filtering device of claim 9, wherein the internal support member includes a substantially fixed V-shaped member.

18. The filtering device of claim 9, further comprising a plurality of wear shoes, each fixedly attached to one of the filter elements and configured to engage the internal support member.

19. The filtering device of claim 18, wherein the wear shoes include a non-metallic element arranged to define a substantial V-shape.

20. The filtering device of claim 9, wherein the non-zero distance is about one-eighth of an inch (3.2 mm).

21. A filtering device suitable for filtering a flow of fluid in a channel, the flow of fluid defining an upstream side, a downstream side, and a flow direction, the channel defining a channel floor and an operating floor, the filtering device comprising:
a plurality of filter elements coupled to one another to define a filter loop, the filter loop configured to position a filter element in the channel to filter a portion of the flow of fluid;
a side frame disposed at least partially within the channel and configured to support the plurality of filter elements for movement; and
a connector accessible from the upstream side to connect one of the plurality of filter elements to the side frame, the connector configured to be removed to allow removal of the filter element in a direction substantially parallel to the flow direction, wherein each of the filter elements includes a perforated plate, a first seal plate, and a second seal plate, and wherein a first end of the perforated plate is embedded in the first seal plate, and a second end of the perforated plate is embedded in the second seal plate.

22. The filtering device of claim 21, further comprising a plurality of resilient seal members, each seal member coupled to one of the plurality of filter elements such that the seal member is at least partially compressed by an adjacent filter element.

23. The filtering device of claim 22, wherein one of the resilient seal members includes a first end embedded in the first seal plate and a second end embedded in the second seal plate.

24. The filtering device of claim 21, further comprising a first side seal assembly disposed between the channel and the filter element, and a second side seal assembly disposed between the channel and the filter element, the first side seal assembly and the second side seal assembly cooperating to inhibit the flow of fluid between the channel and the filter element.

25. The filtering device of claim 24, wherein a portion of the first side seal assembly and a portion of the second side seal assembly are movable in a direction substantially normal to the flow of fluid.

26. The filtering device of claim 21, further comprising an internal support member disposed between a first end of the seal element and a second end of the seal element and spaced a non-zero distance from the filter element, the non-zero distance selected such that the internal support member contacts the filter element to inhibit deflection of the filter element beyond a predetermined deflection.

27. A filtering device suitable for filtering a flow of fluid in a channel, the filtering device comprising:
a plurality of filter elements coupled to one another to define a filter loop, the filter loop configured to position a filter element in the channel to filter a portion of the flow of fluid;
a first seal member disposed substantially within the channel and movable in a direction substantially perpendicular to the flow of fluid to contact a first side of the filter element in the channel;
a second seal member disposed substantially within the channel and movable in a direction substantially perpendicular to the flow of fluid to contact a second side of the filter element in the channel;
a third seal member disposed substantially within the channel and configured to contact the channel and the first side of the filter element in the channel, the third seal member including a first portion that is biased in a direction toward the channel by the flow of fluid, and a second portion that is biased in a direction toward the filter element by the flow of fluid; and
a fourth seal member disposed substantially within the channel and configured to contact the channel and the second side of the filter element in the channel, the first seal member, the second seal member, the third seal member, and the fourth seal member cooperating to inhibit flow between the channel and the filter element in the channel.

28. The filtering device of claim 27, wherein each of the filter elements includes a perforated plate, a first seal plate, and a second seal plate, and wherein a first end of the perforated plate is embedded in the first seal plate, and a second end of the perforated plate is embedded in the second seal plate.

29. The filtering device of claim 28, further comprising a plurality of resilient seal members, each seal member coupled to one of the plurality of filter elements such that the seal member is at least partially compressed by an adjacent filter element.

30. The filtering device of claim 29, wherein one of the resilient seal members includes a first end embedded in the first seal plate and a second end embedded in the second seal plate.

31. The filtering device of claim 27, further comprising an internal support member disposed between a first end of the seal element and a second end of the seal element and spaced a non-zero distance from the filter element, the non-zero distance selected such that the internal support member contacts the filter element to inhibit deflection of the filter element beyond a predetermined deflection.

32. A filtering device suitable for filtering a flow of fluid in a channel, the filtering device comprising:
- a plurality of filter elements coupled to one another to define a filter loop, the filter loop configured to position a filter element in the channel to filter a portion of the flow of fluid, each filter element including:
  - a perforated plate positioned such that the plate extends in a lengthwise direction that is substantially normal to the flow of fluid, the perforated plate including a first end, a second end, and a plurality of apertures;
  - a first seal plate; and
  - a second seal plate, the first end embedded within the first seal plate and the second end embedded within the second seal plate, the first end and the first seal plate cooperating to define a first seal.

33. The filtering device of claim 32, further comprising a channel wall seal having a first leg and a second leg, the first leg in direct contact with the first seal plate to define a second seal.

34. The filtering device of claim 33, wherein the second leg is in direct contact with the channel to define a third seal.

35. The filtering device of claim 34, wherein the flow of fluid in the channel applies a force to the channel wall seal that enhances the contact between the first leg and the first seal plate and the second leg and the channel.

36. The filtering device of claim 34, further comprising an adjustable side seal that includes a seal leg that is movable in a direction normal to the flow of fluid to place the seal leg in direct contact with the first seal plate to define a fourth seal.

37. The filtering device of claim 32, further comprising a plurality of resilient seal members, each seal member coupled to one of the plurality of filter elements such that the seal member is at least partially compressed by an adjacent filter element to inhibit the flow of fluid between the adjacent filter elements.

38. The filtering device of claim 37, wherein one of the resilient seal members includes a first end embedded in the first seal plate and a second end embedded in the second seal plate.

39. The filtering device of claim 32, further comprising a brush seal disposed between a lowermost portion of the channel and a lowermost one of the plurality of filter elements to inhibit the flow of fluid beneath the plurality of filter elements.

* * * * *